Dec. 30, 1924.
E. T. JENKINS
VEHICLE BODY
Filed June 11, 1924
1,521,156
4 Sheets-Sheet 1
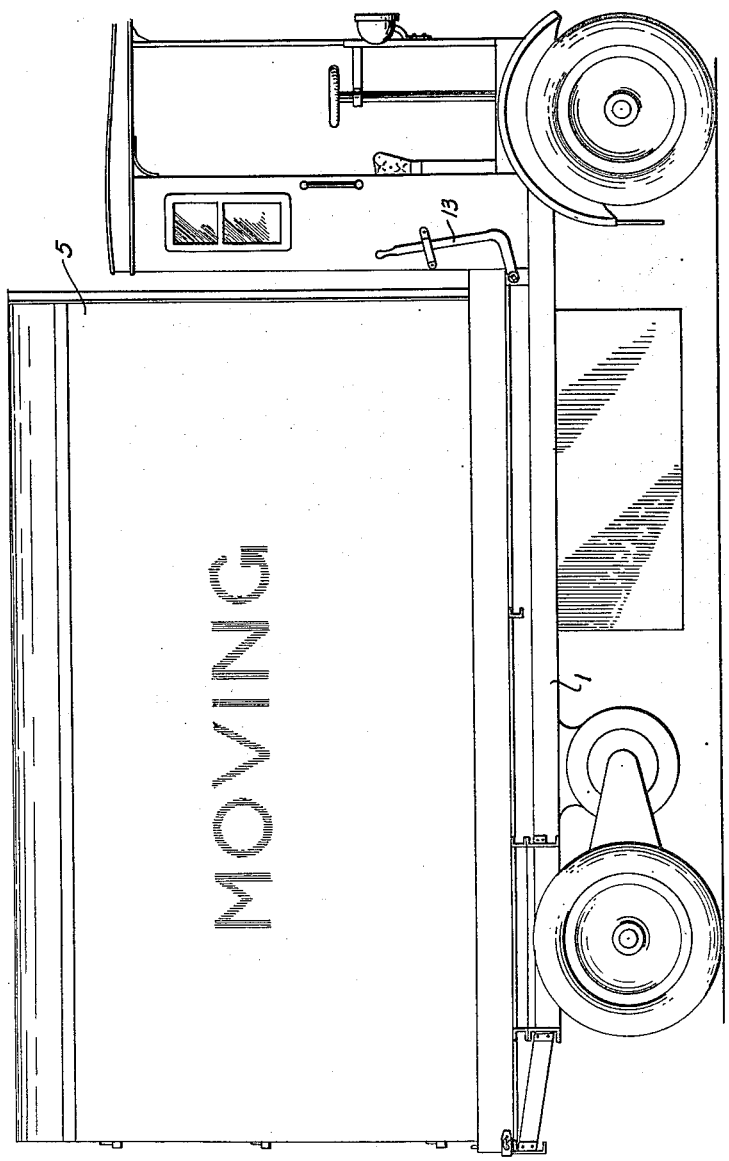
INVENTOR
Edward T. Jenkins,
BY
His ATTORNEY.

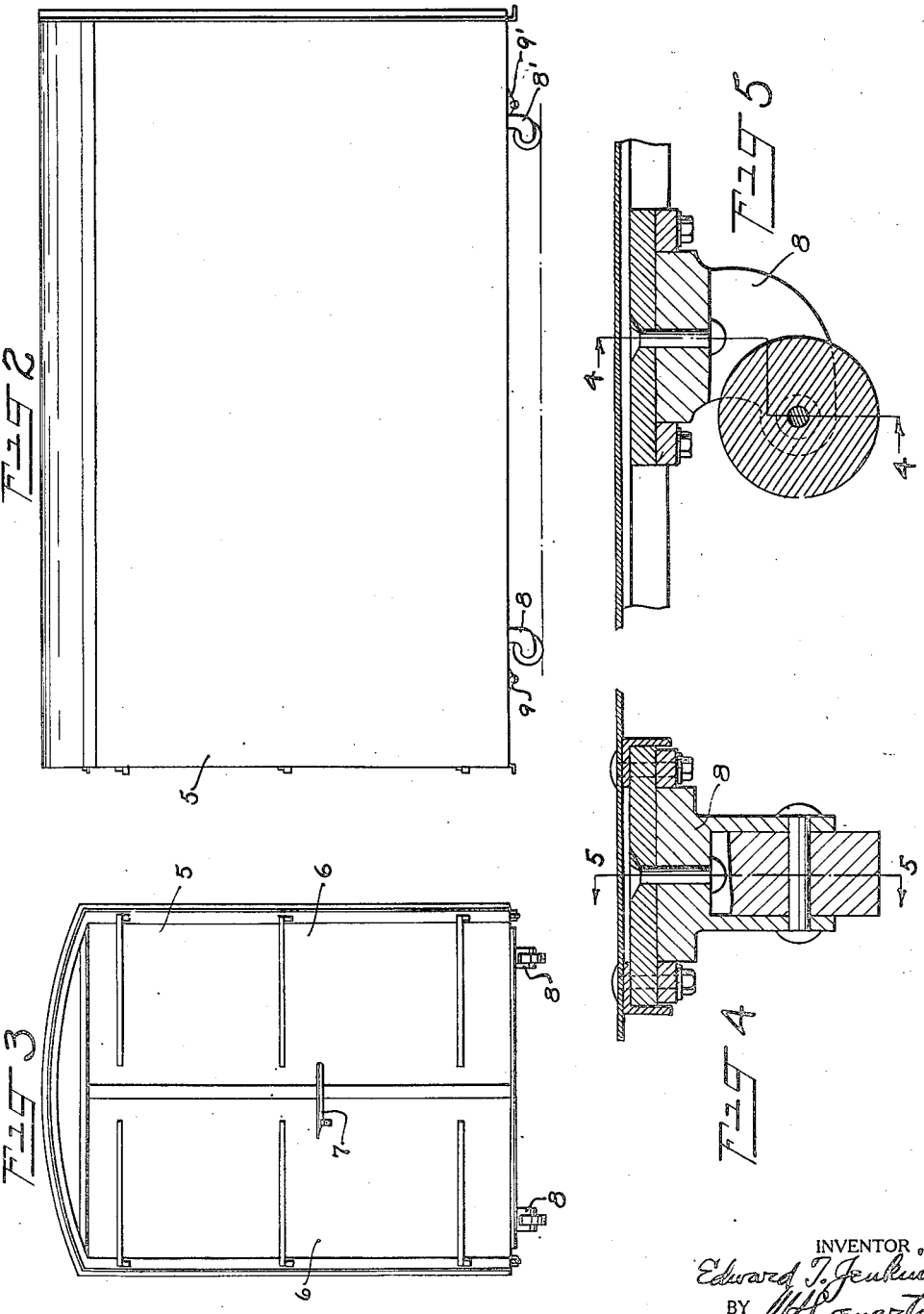

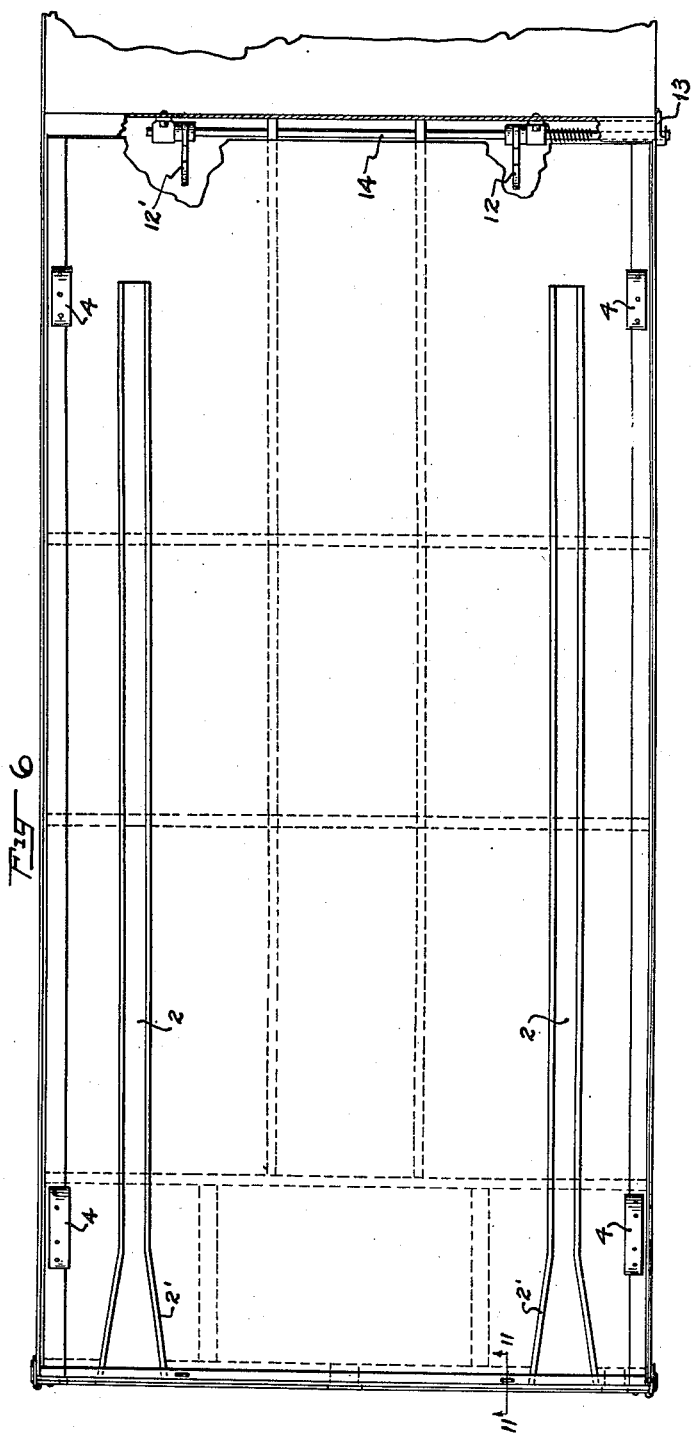
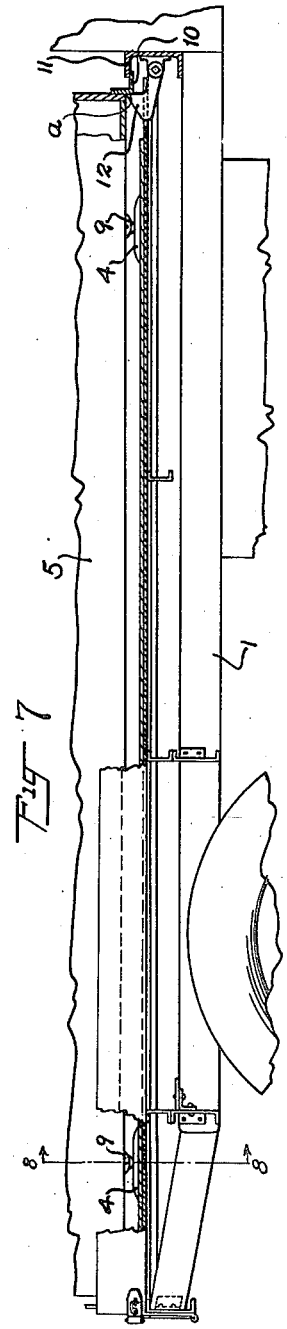

Dec. 30, 1924.
E. T. JENKINS
1,521,156
VEHICLE BODY
Filed June 11, 1924      4 Sheets-Sheet 4
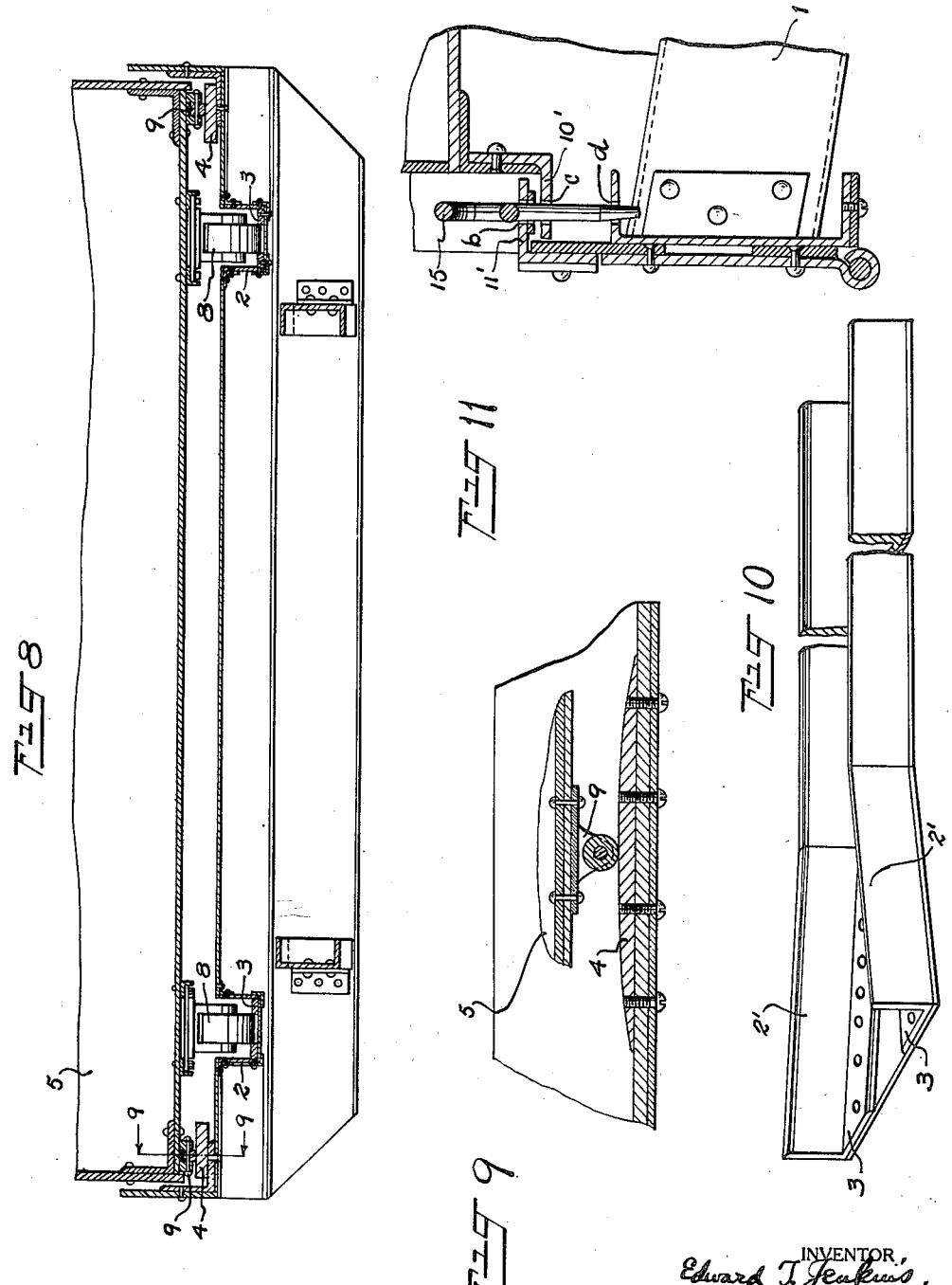

Patented Dec. 30, 1924.

1,521,156

UNITED STATES PATENT OFFICE.

EDWARD T. JENKINS, OF BROOKLYN, NEW YORK.

VEHICLE BODY.

Application filed June 11, 1924. Serial No. 719,309.

*To all whom it may concern:*

Be it known that I, EDWARD T. JENKINS, a citizen of the United States, residing at Brooklyn, county of Kings, and State of New York, have invented a new and useful Improvement in Vehicle Bodies, of which the following is a specification.

This invention relates to vehicle vans and more particularly to those which are used for storage warehouse and shipping purposes. It has for its particular objects the provision of a vehicle body which is suitable for use as an ordinary truck or to which may be expeditiously applied a removable van or supplemental body in such a manner that while readily and quickly removable therefrom, in order to admit of its being conveniently stored, it is, during transportation, rigidly secured thereto. Furthermore, said removable body can be locked or sealed personally by the owner of its contents and can be periodically disinfected.

My invention is fully set forth in detail in the following description and drawings forming a part thereof, in which—

Figure 1 is a side elevation of an automobile moving or shipping van embodying my invention.

Fig. 2 is a side elevation of the removable van thereof and Fig. 3 is an end elevation of the same.

Fig. 4 is a vertical section along the line 4—4 of Fig. 5 and Fig. 5 is a vertical section along line 5—5 of Fig. 4, except that the wheel is shown in elevation.

Fig. 6 is a plan view of the platform of the truck body, the same being particularly broken away to show the locking means.

Fig. 7 is a fragmentary side elevation partially broken away, of said platform and its supporting beams.

Fig. 8 is a fragmentary transverse section of the removable van body and said platform and Fig. 9 is a longitudinal section on the line 9—9 of Fig. 8.

Fig. 10 is a perspective view of one of the tracks, isolated, from said platform.

Fig. 11 is a vertical section along the line 11—11 of Fig. 6.

Referring to the drawings and the construction shown therein, the reference 1 designates the platform of the body of an automobile truck provided with depressed tracks or channels 2, which as shown are flared at their outer ends 2' for the purpose hereinafter described. These tracks are preferably provided with longitudinal, spaced guides 3 which project upwardly from the bottom of said tracks.

Two pairs of cams 4, 4' respectively, are secured to the opposite lateral edges of said platform, the same being adapted to co-operate with roller members of a removable van or body which will now be described.

The removable van comprises a rectangular box-like structure 5, provided with a pair of rear doors 6 and suitable locking means 7. Said van is provided with 2 pairs front and rear swivel follower wheels or castor members 8, 8' respectively. These wheels, while said van is being loaded upon or removed from the truck, are adapted to normally ride upon the track members 2 and project between the longitudinal guides 3 thereof. Said guides serve to not only hold said wheels in alignment and prevent their rotation during the loading of the van onto or unloading of the van from upon said platform, but also during transportation of the van they prevent any sidewise movement thereof. The flared ends 3 of said tracks serve to gradually align the front and rear swivel wheels so as to feed or present such wheels between the guides 3 in the forward travelling position irrespective of the direction which said wheels are travelling as they enter into said flared ends 2'.

Supplemental roller members 9, 9' are mounted adjacent to each of said swivel follower wheels and these are adapted to co-operate with said cam faces 4 so as to raise the wheels 8, 8' of the van body off of said tracks 2 when the van is in its final travelling position on said platform and thus relieve the said wheels and particularly the axles thereof from all weight of the loaded or empty van during transportation. As a consequence there is little or no likelihood of any injury occurring to said wheel members as would otherwise often be the case during transportation were the loaded van to rest with its full weight directly on said wheels.

The front and rear ends of said van 5 are provided with projecting flanges 10, 10' which are adapted to normally lie beneath the co-operating flanges 11, 11' provided on the rear of the driver's compartment and tail-board of the vehicle respectively.

At the front end of said body, I provide suitable locking means for securing the van or body against rearward longitudinal movement and this, together with the aforesaid co-operating flanges 10', 11', as well as the co-operating wheels 8, 8' and guides 3, securely hold the van against upward lateral or rearward movement. Preferably such locking means comprises spring-pressed latch members 12, 12' which are adapted to engage the rear face $a$ of the companion member of the angle iron of which flange 10 constitutes a part. A suitable shift-lever 13, which is secured to the rod 14 upon which such latch members are mounted, serves to permit of the locking and unlocking of such latch members.

The tail-board of the truck body which is swiveled so as to drop down in the usual manner, is preferably locked by means of pins 15 which are adapted to extend through aperture $b$ in flanges 11' of said tail-board through aperture $c$ in flange 10' and through aperture $d$ in the beam forming part of the support frame of the platform 1.

Among the advantages of the foregoing construction are the ease with which the van, when removed from the vehicle body can be manually manipulated by an operator, the facility with which the wheels can be brought into alignment with the tracks or channels on the vehicle body and the rigidity with which it can be locked to said vehicle body so as to be for all practical purposes securely connected thereto as if it were an integral part thereof. Furthermore, the supplemental body is ideally suited for transportation in railroad cars and on steamers, as well as for storage in separate compartments or rooms in storage warehouses, thus eliminating the necessity for repeated loading and unloading of household goods between the time when they are once removed from the house of the owner thereof and the return of the same after the period of storage has ended.

While I have described the preferred construction of my improved vehicle and storage van, it is evident that various other modifications within the scope of the appended claims can be made without departing from the spirit of the invention covered thereby.

I claim:

1. In a vehicle, the combination comprising an underframe, axles adapted to support the same, a truck body, including a platform member, mounted on said underframe, said platform being provided with suitable trackage extending longitudinally thereof, a removable van member adapted to be optionally secured upon said platform member, swiveled wheels mounted on the bottom of said van body and adapted to normally carry the weight thereof when said van body is being moved onto or from said platform, co-operating members, including a plurality of roller members and plurality of cam surfaces for carrying the weight of said van body when the same is in its final position on said platform member, certain of said co-operating members being mounted on said van member and the other co-operating members therefor being mounted on said platform member, means for locking said van member to said platform, said means including forwardly and rearwardly projecting flange members on said van member and co-operating flange members on said truck body.

2. In a vehicle, the combination comprising an underframe, axles adapted to support the same, a truck body, including a platform member, mounted on said underframe, said platform being provided with suitable trackage extending longitudinally thereof, a removable van member adapted to be optionally secured upon said platform member, swiveled casters mounted on the bottom of said van body and adapted to normally carry the weight thereof when said van body is being moved onto or from said platform, co-operating members, including a plurality of roller members and a plurality of cam surfaces for carrying the weight of said van body when the same is in its final position on said platform member, certain of said co-operating members being mounted on said van member and the other co-operating members therefor being mounted on said platform member, means for locking said van member to said platform, said means including forwardly and rearwardly projecting flange members on said van member and co-operating flange members on said truck body.

3. In a vehicle, the combination comprising an underframe, axles adapted to support the same, a truck body, including a platform member mounted on said underframe, said platform being provided with suitable trackage extending longitudinally thereof, one end of said trackage being flared outwardly so as to automatically effect the alignment of wheels entering therein, a removable van member adapted to be optionally secured upon said platform member, swiveled wheels mounted on the bottom of said van body and adapted to normally carry the weight thereof when said van body is being moved onto or from said platform, co-operating members, including a plurality of roller members and a plurality of cam surfaces for carrying the weight of said van body when the same is in its final position on said platform member, certain of said co-operating members being mounted on said van member and the other co-operating members therefor being mounted on said platform member, means for securing said van member on said platform, said means including forwardly and rearwardly projecting flange members connected to said truck body and to said van, certain of said flanges being adapted to be brought into over-lapping relations with each other.

4. In a vehicle, the combination comprising an underframe, axles adapted to support the same, a truck body, including a platform member mounted on said underframe, said platform being provided with suitable trackage extending longitudinally thereof, a removable van member adapted to be removably secured upon said truck member, swivled wheels mounted on the bottom of said van body and adapted to normally carry the weight thereof when said van body is being moved onto or from said platform, co-operating members including a plurality of roller members and a plurality of cam surfaces for carrying the weight of said van body when the same is in its final position on said platform member, certain of said co-operating members being mounted on said van member and the other co-operating members being mounted on said platform member, means for locking said van member to said platform, said means including forwardly and rearwardly projecting flange members, provided upon said van member and co-operating flange members connected to said platform member and including a tail board member adapted to be swung into a vertical position, said tail board member being provided with flanged means adapted to co-operate with one of said flanges on said van member and means adapted to hold said flanges in fixed relation to each other.

5. In a vehicle, the combination comprising an underframe, axles adapted to support the same, a platform member mounted on said underframe, said platform being provided with suitable track channels extending longitudinally thereof, a removable van member adapted to be optionally secured upon said platform member, swiveled wheels mounted on the bottom of said van body and adapted to normally carry the weight thereof when said van body is being moved onto or from said platform, co-operating members including a plurality of roller members and a plurality of cam surfaces for carrying the weight of said van body when the same is in its final position on said platform member, certain of said co-operating members being mounted on said van member and the other co-operating members therefor being mounted on said platform member, means for locking said van member to said platform, said means including forwardly and rearwardly projecting apertured flange members provided upon said van member and co-operating apertured flange members connected to said truck body and means adapted to project through such apertures for locking said flanges in overlapping relation with respect to each other.

6. In a vehicle, the combination comprising an underframe, axles adapted to support the same, a platform member mounted on said underframe, said platform being provided with suitable track channels extending longitudinally thereof, a removable van member adapted to be optionally secured upon said platform member, swiveled wheels mounted on the bottom of said van body and adapted to normally carry the weight thereof when said van body is being moved onto or from said platform, co-operating members including a plurality of roller members and a plurality of cam surfaces for carrying the weight of said van body when the same is in its final position on said platform member, certain of said co-operating members being mounted on said van member and the other co-operating members therefor being mounted on said platform member, means for locking said van member to said platform, said means including forwardly and rearwardly projecting apertured flange members provided upon said van member and co-operating apertured flange members connected to said truck body and manually controlled elastic locking means on the truck body adapted to snap into engagement with said van body.

7. The sub-combination comprising a van member adapted to be optionally mounted upon a platform, swiveled caster wheels mounted on the bottom of said van body, said wheels being normally adapted to act as followers and to thereby become automatically aligned during the travel of the van along a surface by frictional contact of said wheels therewith and supplemental rollers adapted to relieve the wheels from direct weight of said van when the said van is elevated sufficiently to just raise the said wheels out of contact with an underlying platform.

Signed at Brooklyn, in the county of Kings and State of New York, this 6th day of June, 1924.

EDWARD T. JENKINS.